(No Model.)

D. E. NEWELL.
PULLEY.

No. 543,887. Patented Aug. 6, 1895.

Witnesses:-

Inventor:-
Darius E. Newell,
by his attorney,

UNITED STATES PATENT OFFICE.

DARIUS E. NEWELL, OF NEW YORK, N. Y.

PULLEY.

SPECIFICATION forming part of Letters Patent No. 543,887, dated August 6, 1895.

Application filed October 19, 1894. Serial No. 526,392. (No model.)

*To all whom it may concern:*

Be it known that I, DARIUS E. NEWELL, of New York, in the State of New York, have invented a certain new and useful Improvement in Pulleys, of which the following is a specification.

My invention is directed toward the overcoming of difficulties and inconveniences which arise during the running of ordinary belts upon ordinary pulleys—namely, the so-called "air-cushion" or layer of air, which is drawn in between the surface of the pulley and the inner surface of the belt as the two approach each other. As a result of this air-cushion the belt does not have that adhesion to the surface of the pulley which it is essential it should have to exert its proper effect in rotating the pulley and slipping oftentimes ensues. Especially is this slipping action liable to occur in belts having high linear velocity. To obviate this defect I provide pulleys having recesses or cavities designed to prevent the formation of this air-cushion or which offers a vent to such layers of air when formed.

I will describe a pulley in which the features of my improvement are embodied.

Figure 1:
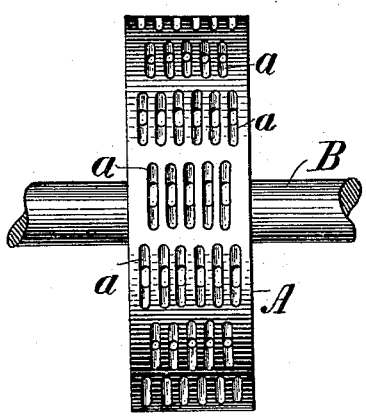
Figure 2:
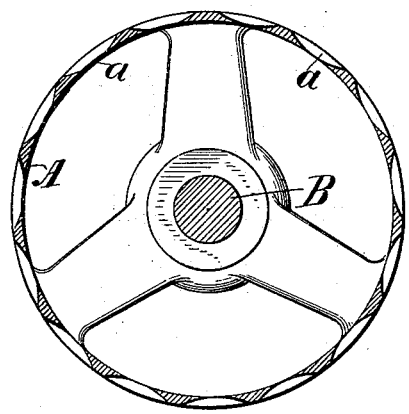

In the accompanying drawings, Figure 1 is a side view of a pulley embodying my improvement. Fig. 2 is an end elevation thereof.

Similar letters of reference designate corresponding parts in both figures.

My improvement is applicable to all forms and materials of pulleys, including wooden pulleys, cast pulleys, or those which are of a built-up construction, and has reference solely to the manner in which the outer surface or periphery is formed.

A designates a pulley whose outer surface is provided with a number of slots or recesses *a*. Any suitable number may be used. B is the shaft to which the pulley may be secured. These slots *a* may be of any convenient depth and may pass through the periphery of the pulley midway of their length. They may be formed on the surface of the pulley by a milling-machine, but if the pulley is cast the slots may be formed in the pulley at the time of molding the same. They may, however, not extend through the periphery of the pulley but consist of recesses or pockets therein. Each slot tapers centrally—that is, its depth at its central portion is greater than the depth near the ends of the slot.

In positioning the slots over the surface of the pulley I preferably employ the arrangement shown in the figures. As there shown, each slot is disposed with its longitudinal dimension extending approximately at right angles to the shaft B, while the several slots are arranged in groups across the periphery of the pulley. The several slots in each group are also arranged in line with the spaces between the slots in an adjacent group, presenting thus a staggered appearance.

In using the term "pulley" in this specification I wish to include not only what is understood as a pulley, but all devices used for analogous purposes.

What I claim as new, and desire to secure by Letters Patent, is—

A pulley having a rim provided with a number of centrally tapering recesses or pockets positioned circumferentially and arranged in groups over its outer surface, the edges of the recesses or pockets on all sides being formed within the peripheral surface of the pulley, and the recesses or pockets being provided midway with holes or openings at their bottoms extending through the inner surface of the rim, the areas of these holes or openings at their inner surfaces being less than the area of the recesses or pockets at the outer surface of the pulley, and the recesses in the several groups being relatively staggered, substantially as specified.

In testimony whereof I have signed my name to this specification in the presence of two subscribing witnesses.

DARIUS E. NEWELL.

Witnesses:
ANTHONY GREF,
PIERSON L. WELLS.